(12) United States Patent
Morris et al.

(10) Patent No.: US 11,302,144 B1
(45) Date of Patent: Apr. 12, 2022

(54) GAMING DEVICES HAVING RANDOMLY GENERATED BONUS NUMBERS

(71) Applicant: DraftKings, Inc., Boston, MA (US)

(72) Inventors: Kyle Morris, Las Vegas, NV (US); Jason March, Las Vegas, NV (US)

(73) Assignee: DraftKings, Inc., Boston, MA (US)

( * ) Notice: Subject to any disclaimer, the term of this patent is extended or adjusted under 35 U.S.C. 154(b) by 0 days.

(21) Appl. No.: 17/205,299

(22) Filed: Mar. 18, 2021

(51) Int. Cl.
 *G07F 17/32* (2006.01)
 *G06F 7/58* (2006.01)
 *A63F 9/04* (2006.01)

(52) U.S. Cl.
 CPC ............ *G07F 17/3244* (2013.01); *A63F 9/04* (2013.01); *G06F 7/588* (2013.01); *G07F 17/3204* (2013.01); *G07F 17/3267* (2013.01); *G07F 17/3293* (2013.01)

(58) Field of Classification Search
 CPC ............. G07F 17/3244; G07F 17/3204; G07F 17/3267; G07F 17/3293
 See application file for complete search history.

(56) References Cited

U.S. PATENT DOCUMENTS

| | | | |
|---|---|---|---|
| 2013/0079084 A1* | 3/2013 | Sparago | A63F 1/00 463/11 |
| 2019/0080551 A1* | 3/2019 | Marston | G07F 17/3213 |
| 2020/0342715 A1* | 10/2020 | Hiten | G07F 17/3267 |
| 2021/0241572 A1* | 8/2021 | Marks | G07F 17/3213 |

\* cited by examiner

*Primary Examiner* — Yingchuan Zhang
(74) *Attorney, Agent, or Firm* — Foley & Lardner LLP

(57) ABSTRACT

The present disclosure provides gaming systems having one or more processors coupled to memory. The gaming system can receive an indication of a wager on a play of a game. The gaming system can decrease a credit balance based on the wager. The gaming system can determine a first number as a target value and a second number as a modifier. The gaming system can determine an initial award amount based on the wager and a result of the play independent of the first number. The gaming system can determine that a game event of the play satisfies a bonus award condition based on the first number. The gaming system can compute a bonus award based on the second number and the initial award amount. The gaming system can cause the credit balance to increase based on the computed bonus award and the initial award amount.

18 Claims, 9 Drawing Sheets

GAMING DEVICES HAVING RANDOMLY GENERATED BONUS NUMBERS

BACKGROUND

Gaming machines or devices, such as networked gaming devices, can provide awards as a result of gaming events. Players generally place wagers to activate a game, and can receive an award when a winning condition is met.

SUMMARY

In conventional wager based games, it can be challenging to provide engaging interactive gaming content using wagers alone. It is therefore advantageous for a system to provide additional engagement features, such as bonus award features, in interactive gaming content. Conventional interactive gaming content does not include additional bonus features that are randomly generated. Randomly generated bonus award amounts, and randomly generated bonus conditions can increase end user engagement with games and interactive content. Further, cloud computing allows for the distributed provisioning and processing of interactive gaming features across many end user devices, thereby providing improved performance when compared to other implementations. Thus, the systems and methods of this technical solution provide a technical improvement to gaming devices by providing additional, randomly generated engagement features.

At least one aspect of the present disclosure is directed to a gaming system. The gaming system can include one or more processors coupled to memory. The gaming system can receive an indication of a wager on a play of a game. The gaming system can decrease a credit balance based on the wager. The gaming system can determine, responsive to the indication of the wager, a first number as a target value and a second number as a modifier. The gaming system can, upon completion of the play, determine an initial award amount based on the wager and a result of the play independent of the first number. The gaming system can determine that a game event of the play satisfies a bonus award condition based on the first number. The gaming system can, responsive to determining that the game event satisfies the bonus award condition based on the first number, compute a bonus award based on the second number and the initial award amount. The gaming system can cause the credit balance to increase based on the computed bonus award and the initial award amount.

In some implementations, the game can be a card-based game, and the play can include a hand having a plurality of cards. In some implementations, the gaming system can adjust the credit balance based on the result of the play by increasing the credit balance based on the hand satisfying a game condition. In some implementations, the card-based game can be one of poker, blackjack, or rummy. In some implementations, the game is a dice-based game, and the play can include a plurality of dice each indicating a rank. In some implementations, the gaming system can adjust the credit balance based on the result of the play by increasing the credit balance based on the rank of each of the plurality of dice satisfying a game condition. In some implementations, the dice-based game can be one of craps, sic bo, or Klondike.

In some implementations, the gaming system can determine that the game event satisfies the bonus award condition by identifying each card included in the hand. In some implementations, the gaming system can determine that the game event satisfies the bonus award condition by determining a total based on a value corresponding to each card. In some implementations, the gaming system can determine that the game event satisfies the bonus award condition by determining that the total is equal to the first number. In some implementations, the gaming system can compute the bonus award by multiplying the wager and the second number.

In some implementations, the gaming system can receive, from a client device, a request to participate in a bonus opportunity corresponding to the bonus award. In some implementations, the gaming system can randomly determine the first number as the target value and the second number as the modifier responsive to the request to participate in the bonus opportunity and the wager. In some implementations, the gaming system can receive the indication of the wager by providing, at the client device, a user interface via which a user can place the wager and select to participate in the bonus opportunity corresponding to the bonus award. In some implementations, the gaming system can receive the indication of the wager by receiving, from the client device, a request to place the wager, the request identifying a wager amount and an indicator indicating that the user is participating in the bonus opportunity.

In some implementations, the gaming system can provide, at the client device, prior to completion of the play, via the user interface, an actionable object via which the user can participate in the bonus opportunity corresponding to the bonus award. In some implementations, the gaming system can receive, from the client device, responsive to an interaction with the actionable object prior to completion of the game, a request to participate in the bonus opportunity. In some implementations, the gaming system can determine that the game event satisfies the bonus award condition responsive to determining that the user is participating in the bonus opportunity. In some implementations, the gaming system can determine the first number and the second number using a random number generator.

In some implementations, the gaming system can determine the first number using a random number generator. In some implementations, the gaming system can select the second number from a plurality of predetermined numbers in accordance with a policy. In some implementations, the gaming system can select the second number based on the result of the play.

At least one other aspect of the present disclosure is directed to a gaming system. The gaming system can include one or more processors coupled to memory. The gaming system can receive an indication of a wager on a play of a blackjack game. The gaming system can determine, responsive to the indication of the wager, a target hand value and a bonus modifier value. The gaming system can, upon completion of the play of the blackjack game, determine an initial award amount based on the wager and a hand of the blackjack game. The gaming system can determine that the hand of the blackjack game satisfies a bonus award condition based on the target hand value. The gaming system can, responsive to determining that the hand of the blackjack game satisfies the bonus award condition, compute a bonus award based on the bonus modifier value and the wager. The gaming system can cause a credit balance to increase based on the computed bonus award and the initial award amount.

In some implementations, the gaming system can determine the target hand value and the bonus modifier value by determining that the wager satisfies a bonus participation threshold. In some implementations, the gaming system can determine the target hand value and the bonus modifier value by computing at least one of the target hand value or the bonus modifier value based on the bonus participation threshold. In some implementations, the gaming system can present, at a client device, a graphical user interface comprising a blackjack table, and an actionable object. In some implementations, the gaming system can receive the indication of the wager responsive to detecting an interaction with the actionable object. In some implementations, the gaming system can present, in the graphical user interface, during the play of the blackjack game and responsive to receiving the indication of the wager, the hand of the blackjack game on the blackjack table.

In some implementations, the target hand value can be a range of target values. In some implementations, the gaming system can determine that the hand of the blackjack game satisfies the bonus award condition by determining that values of each card in the hand sum to a value within the range of target values. In some implementations, the gaming system can receive, as part of the indication of the wager, an indication of participation in the bonus award, the indication of participation including a bonus wager. In some implementations, the gaming system can compute the bonus award based on the bonus wager and the bonus modifier value.

At least one other aspect of the present disclosure is directed to a gaming system. The gaming system can include one or more processors coupled to memory. The gaming system can receive an indication of a wager on a play of a poker game. The gaming system can determine, responsive to the indication of the wager, a target hand rank and a bonus modifier value. The gaming system can, upon completion of the play of the poker game, determine an initial award amount based on the wager and a hand of the poker game, the hand of the poker game having a rank. The gaming system can determine that the rank of the hand satisfies a bonus award condition based on the target hand rank. The gaming system can, responsive to determining that the rank of the hand satisfies the bonus award condition, compute a bonus award based on the bonus modifier value and the wager. The gaming system can cause a credit balance to increase based on the computed bonus award and the initial award amount. In some implementations, the gaming system can determine that the rank of the hand satisfies the bonus award condition by determining that the rank of the hand matches the target hand rank.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. Aspects can be combined and it will be readily appreciated that features described in the context of one aspect of the invention can be combined with other aspects. Aspects can be implemented in any convenient form. For example, by appropriate computer programs, which may be carried on appropriate carrier media (computer readable media), which may be tangible carrier media (e.g. disks) or intangible carrier media (e.g. communications signals). Aspects may also be implemented using suitable apparatus, which may take the form of programmable computers running computer programs arranged to implement the aspect. As used in the specification and in the claims, the singular form of 'a', 'an', and 'the' include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Below are detailed descriptions of various concepts related to, and implementations of, techniques, approaches, methods, apparatuses, and systems for providing games having additional bonus opportunities. The various concepts introduced above and discussed in greater detail below may be implemented in any of numerous ways, as the described concepts are not limited to any particular manner of implementation. Examples of specific implementations and applications are provided primarily for illustrative purposes.

For purposes of reading the description of the various implementations below, the following descriptions of the sections of the Specification and their respective contents may be helpful:

Section A describes a network environment and computing environment which may be useful for practicing embodiments described herein; and Section B describes systems and methods for gaming systems with bonus award opportunities.

A. Computing and Network Environment

Figure 1A:
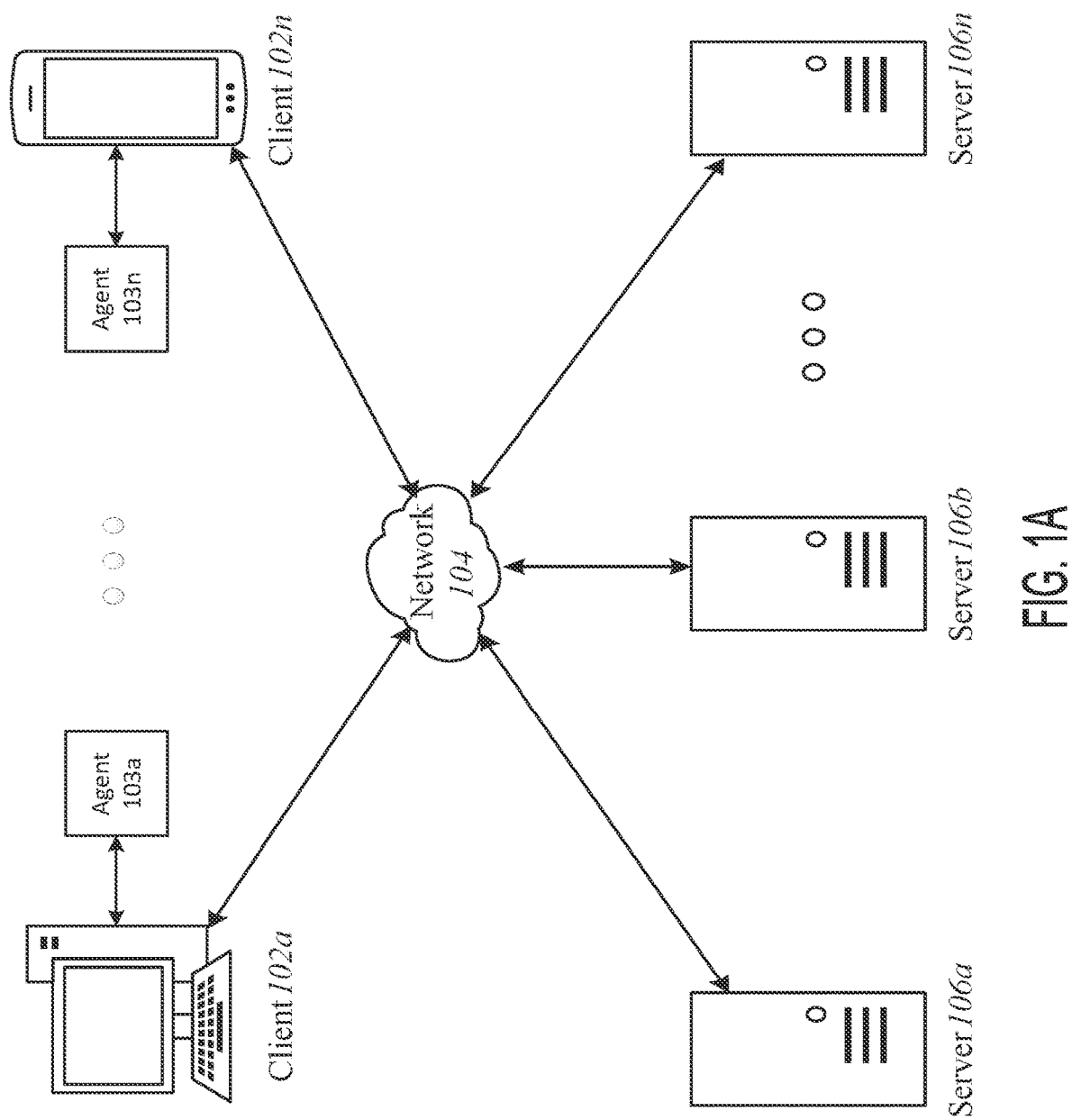
FIG. 1A is a block diagram depicting an embodiment of a network environment comprising a client device in communication with a server device.

Prior to discussing specific implements of the various aspects of this technical solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more agents 103a-103n and one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 (not shown) or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes may be in the path between any two communicating servers.

Figure 1B:
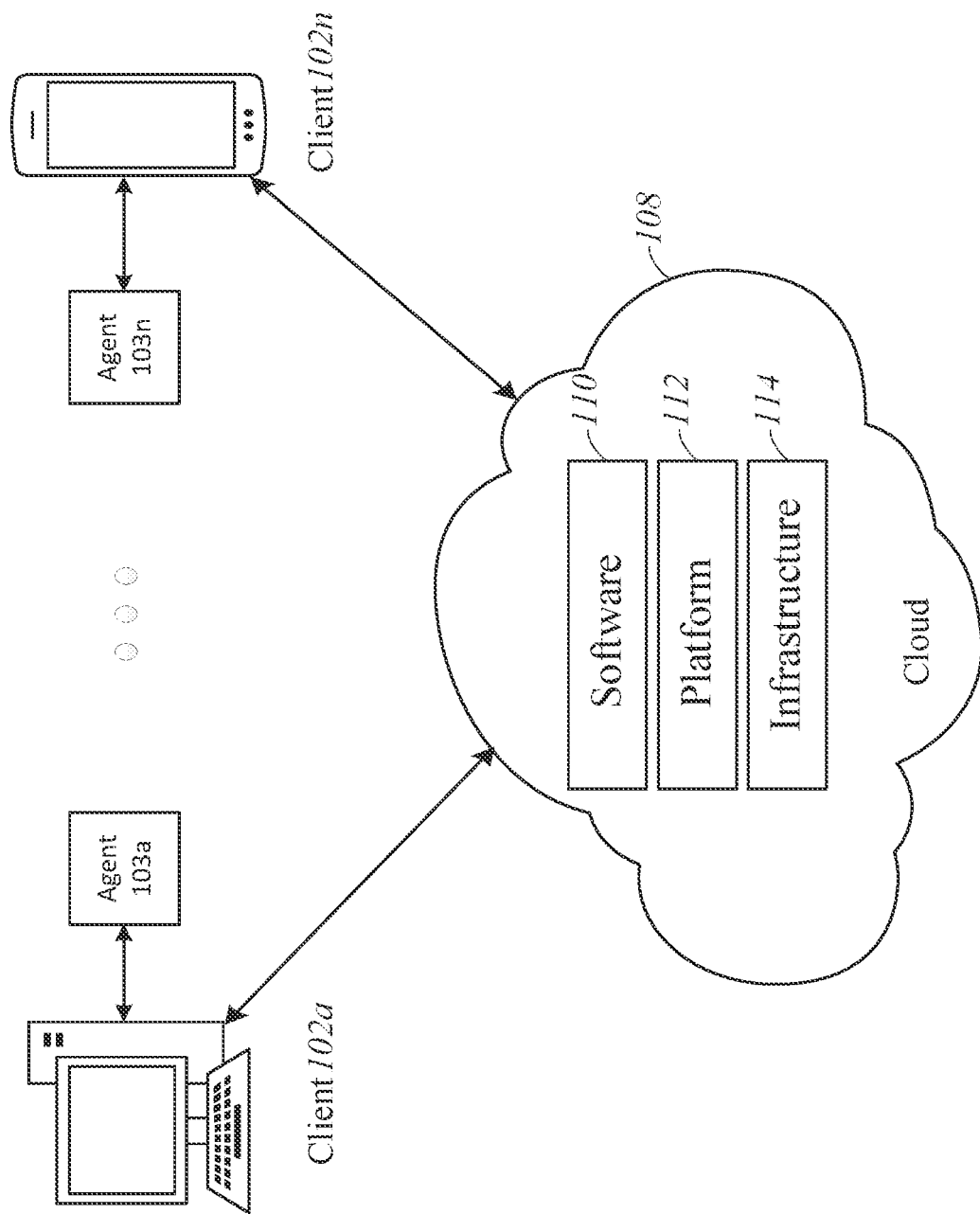
FIG. 1B is a block diagram depicting a cloud computing environment comprising a client device in communication with cloud service providers.

Referring to FIG. 1B, a cloud computing environment is depicted. A cloud computing environment may provide client 102 with one or more resources provided by a network environment. The cloud computing environment may include one or more clients 102*a*-102*n*, in communication with respective agents 103*a*-103*n* and with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
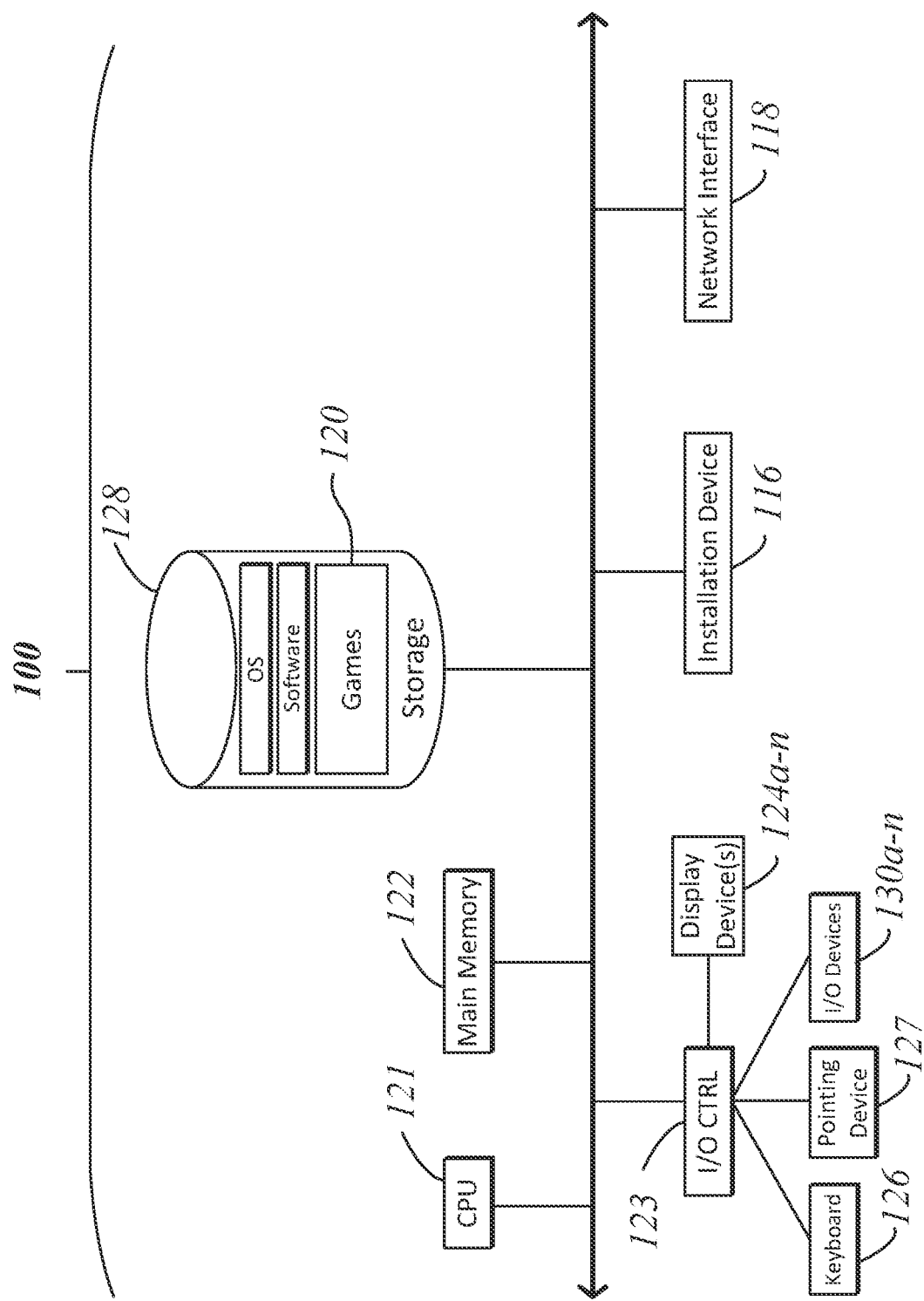
FIGS. 1C and 1D are block diagrams depicting embodiments of computing devices useful in connection with the methods and systems described herein.
Figure 1D:
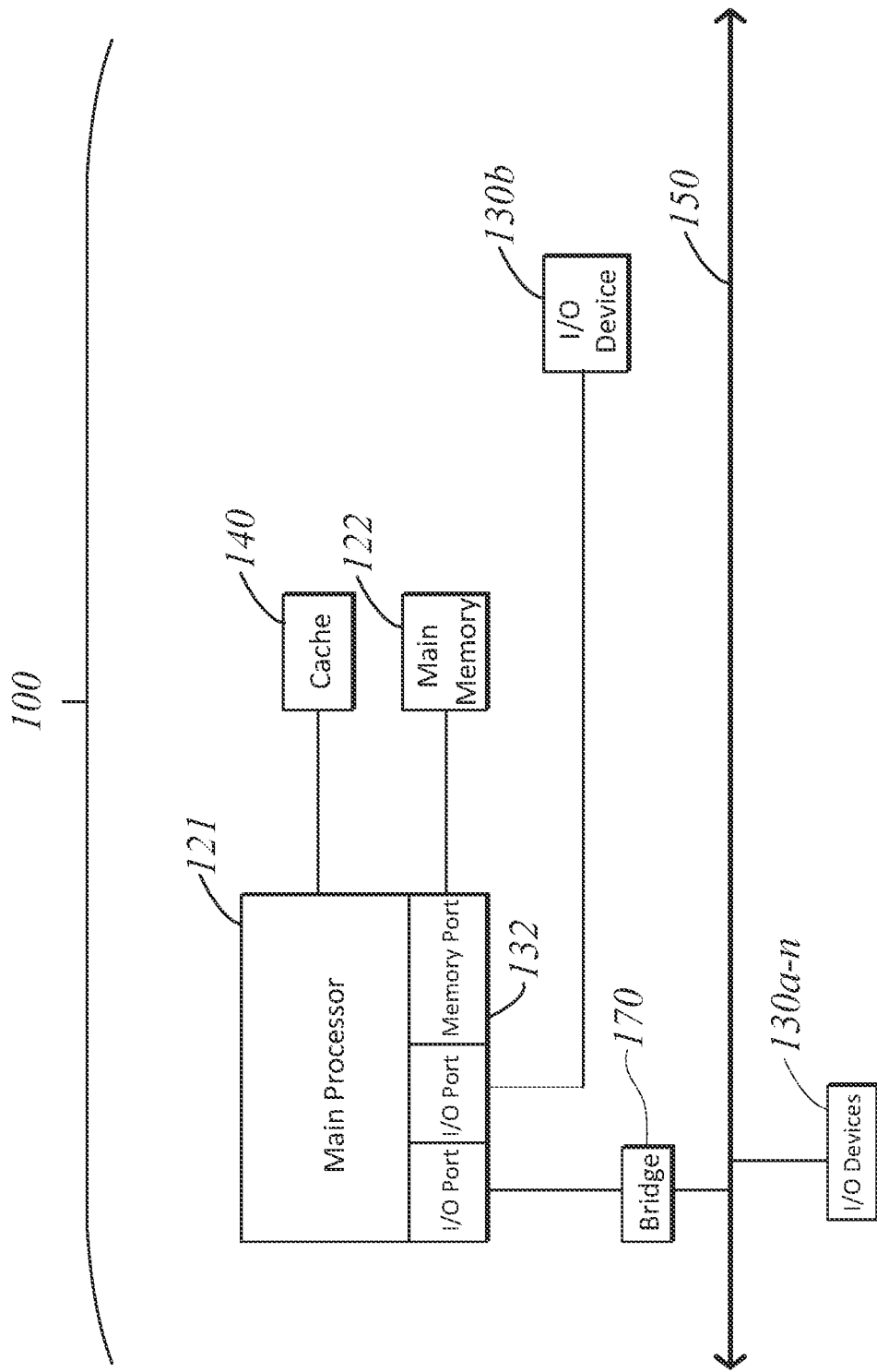

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124*a*-124*n*, a keyboard 126 and a pointing device 127, e.g. a mouse. The storage device 128 may include, without limitation, an operating system, software, and games 120, which can implement any of the features of the gaming system 205 described herein below in conjunction with FIG. 2. As shown in FIG. 1D, each computing device 100 may also include additional optional elements, e.g. a memory port 132, a bridge 170, one or more input/output devices 130*a*-130*n* (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5, INTEL CORE i7, and INTEL CORE i9.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 132. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopic. Display devices 124a-124n may also be a headmounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the games 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via an I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, a PLAYSTATION 4, PLAYSTATION 5, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, NINTENDO WII U, or a NINTENDO SWITCH device manufactured by Nintendo Co., Ltd., of Kyoto, Japan, an XBOX 360, an XBOX ONE, an XBOX ONE S, an XBOX ONE X, an XBOX SERIES S, or an XBOX SERIES X, manufactured by the Microsoft Corporation of Redmond, Wash.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is an eBook reader, e.g. the KINDLE family of devices by Amazon.com, or NOOK family of devices by Barnes & Noble, Inc. of New York City, N.Y.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 are monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Gaming Systems with Bonus Award Opportunities

The systems and methods of this technical solution provide techniques for improved gaming systems that award additional bonus amounts in response to in-game events. The gaming systems described herein can be implemented, for example, in a computing environment, or in a cloud computing environment, such as the cloud computing environment 108 described herein above in conjunction with FIGS. 1A and 1B. In general, gaming systems can provide wagering opportunities that allow a user to risk a specified amount of credits for the opportunity to win more credits. One example is a simple two-to-one payout scheme, where a player receives credits amounting to twice what they wagered to initiate play of a game. However, it should be understood that other payout schemes are possible.

The systems and methods described herein improve upon this principle by providing additional opportunities for the player to be awarded with additional credits, often accompanied by a corresponding risk taken by the player. In some implementations, a bonus award can be awarded based on an in-game condition satisfying a target criteria, such as a specific poker-hand rank, a specific blackjack hand, or a specific dice-roll value. The target criteria can be generated randomly in response to an indication that the player intends to engage in the bonus feature. Said another way, the bonus feature can be implemented as an option, rather than a requirement. However, it should be understood that in some implementations, the bonus feature may be enabled without player interaction, and cannot be disabled.

The systems and methods described herein improve gaming systems by providing additional, bonus award opportunities that are triggered based on randomly generated game conditions. These randomly generated game conditions can be unknown to the player until after the game and as such, can provide additional opportunities for player anticipation, engagement, and enjoyment across many different types of games, and are not necessarily dependent on a game outcome. The random nature of the game conditions can further provide additional strategies for consideration by a user during the play of the game, making the play unique and more enjoyable when compared to a conventional play. Thus, the gaming system described herein can improve different types of games by increasing overall user engagement and amusement, using the generated bonus conditions described herein.

The systems and methods described herein leverage gaming technology (e.g., a networked gaming environment, a cloud, video gaming devices, etc.) to provide games with bonus award opportunities to end user devices, such as laptops, smart phones, personal computers, smart televisions, video gaming devices, or other such computing devices. Although certain aspects of the computing systems described herein are represented as taking place over a network, it should be understood that similar operations can take place on a gaming device, such as a video poker machine, or another type of independent gaming device that may not require communications between a gaming server and a separate gaming client to effectuate the operations described herein. These and other features of gaming devices are described in greater detail herein below.

Figure 2:
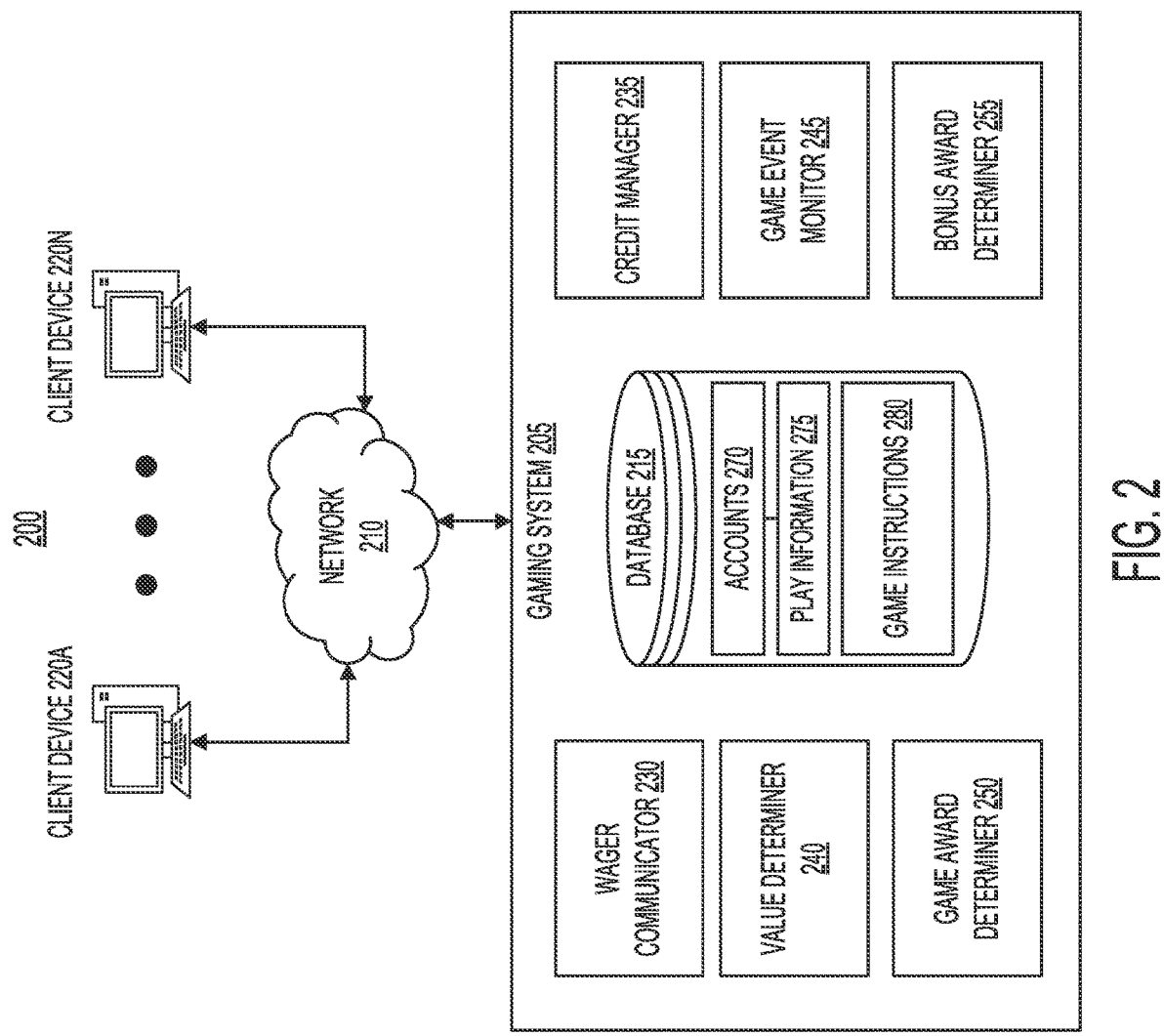
FIG. 2 is a block diagram of an example gaming system that provides bonus award opportunities in response to game events, in accordance with one or more implementations.

Referring now to FIG. 2, illustrated is a block diagram of an example system 200 for providing games having additional award opportunities, in accordance with one or more implementations. The system 200 can include at least one gaming system 205, at least one network 210, and one or more client devices 220A-220N (sometimes generally referred to as client device(s) 220). The gaming system 205 can include at least one wager communicator 230, at least one credit manager 235, at least one value determiner 240, at least one game event monitor 245, at least one game award determiner 250, at least one bonus award determiner 255, and at least one database 215. The database 215 can include one or more accounts 270, one or more play information 275 data structures (sometimes generally referred to as the play information 275), and one or more game instructions 280 (sometimes generally referred to as the game instruction(s) 280). In some implementations, the database 215 can be external to the gaming system 205, for example, as a part of a cloud computing system or an external computing device in communication with the devices (e.g., the gaming system 205, the client devices 220, etc.) of the system 200 via the network 210, etc.).

Each of the components (e.g., the gaming system 205, the network 210, the client devices 220, the wager communicator 230, the credit manager 235, the value determiner 240, the game event monitor 245, the game award determiner 250, the bonus award determiner 255, the database 215, etc.) of the system 200 can be implemented using the hardware components or a combination of software with the hardware components of a computing system, such as the computing system 100 detailed herein in conjunction with FIGS. 1A-1D, or any other computing system described herein. Each of the components of the gaming system 205 can perform the functionalities detailed herein.

The gaming system 205 can include at least one processor and a memory, e.g., a processing circuit. The memory can store processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The gaming system 205 can include one or more computing devices or servers that can perform various functions as described herein. The gaming system 205 can include any or all of the components and perform any or all of the functions of the computer system 100 described herein in conjunction with FIGS. 1A-1D.

The network 210 can include computer networks such as the Internet, local, wide, metro or other area networks, intranets, satellite networks, other computer networks such as voice or data mobile phone communication networks, and combinations thereof. The gaming system 205 of the system 200 can communicate via the network 210, for instance with one or more client devices 220. The network 210 may be any form of computer network that can relay information between the gaming system 205, the one or more client devices 220, and one or more information sources, such as web servers or external databases, amongst others. In some implementations, the network 210 may include the Internet and/or other types of data networks, such as a local area network (LAN), a wide area network (WAN), a cellular network, a satellite network, or other types of data networks. The network 210 may also include any number of computing devices (e.g., computers, servers, routers, network switches, etc.) that are configured to receive and/or transmit data within the network 210. The network 210 may further include any number of hardwired and/or wireless connections. Any or all of the computing devices described herein (e.g., the gaming system 205, the one or more client devices 220, the computer system 100, etc.) may communicate wirelessly (e.g., via WiFi, cellular, radio, etc.) with a transceiver that is hardwired (e.g., via a fiber optic cable, a CAT5 cable, etc.) to other computing devices in the network 210. Any or all of the computing devices described herein (e.g., the gaming system 205, the one or more client devices 220, the computer system 100, etc.) may also communicate wirelessly with the computing devices of the network 210 via a proxy device (e.g., a router, network switch, or gateway). In some implementations, the network 210 can be similar to or can include the network 104 or the cloud 108 described herein above in conjunction with FIGS. 1A and 1B.

Each of the client devices 220 can include at least one processor and a memory, e.g., a processing circuit. The memory can store processor-executable instructions that, when executed by processor, cause the processor to perform one or more of the operations described herein. The processor can include a microprocessor, an application-specific integrated circuit (ASIC), a field-programmable gate array (FPGA), etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions can include code from any suitable computer programming language. The client devices 220 can include one or more computing devices or servers that can perform various functions as described herein. The one or more client devices 220 can include any or all of the components and perform any or all of the functions of the computer system 100 described herein in conjunction with FIGS. 1A-1D. The client devices 220 can be, or can be similar to, the client devices 102 described herein above in conjunction with FIGS. 1A-1D.

Each client device 220 can include, but is not limited to, a television device, a mobile device, or another type of computing device. Each client device 220 can be implemented using hardware or a combination of software and hardware. Each client device 220 can include a display or display portion. The display can include a display portion of a television, a display portion of a computing device, a graphical user interface (GUI), or another type of interactive display (e.g., a touchscreen, a display, etc.) and one or more input/output (I/O) devices (e.g., a mouse, a keyboard, digital key pad). The display can include one or more portions, for example, to display multiple in-game events as described herein. The display can include a tough screen displaying an application, such as the gaming applications described herein. The display can include a border region (e.g., side border, top border, bottom border). In some implementations, the display can include a tough screen display, which can receive interactions from a user. The interactions can result in interaction data, which can be stored and transmitted by the processing circuitry of the client device 220. The interaction data can include, for example, interaction coordinates, an interaction type (e.g., click, swipe, scroll, tap, etc.), and an indication of an actionable object with which the interaction occurred. Each client device 220 can include an input device that couples or communicates with the display of each client device to enable a user to interact with and/or select one or more actionable objects as described herein. The display can enable interaction with one or more visual indications provided through the display of each mobile device 220, and responsive to an interaction (e.g., select, click-on, touch, hover), the client device 220 can generate an indication identifying a user input and/or selection of a wager, an in-game event, or an indication to participate in a bonus event, among others.

Each client device 220 can include or be identified by a device identifier, which can be specific to each respective client device 220. The device identifier can include a script, code, label, or marker that identifies a particular client device 220. In some implementations, the device identifier can include a string or plurality of numbers, letters, characters or any combination numbers, letters, and characters. In some embodiments, each client device 220 can have a unique device identifier. Each client device 220 can include a client application, which can be a gaming application that communicates with the gaming system 205 to play the games described herein. The client application can include a user application executing on each client device 220 or provided to the user device 160 by the server 102. The application can include a web application, a server application, a resource, a desktop, or a file. In some implementations, the application can include a local application (e.g., local to a client device 220), hosted application, Software as a Service (SaaS) application, virtual application, mobile application, and other forms of content. In some implementations, the application can include or correspond to applications provided by remote servers or third party servers. In some implementations, the application can access the accounts 270, the play information 275, or the game instructions 280, stored and maintained at the database 215, and generate one or more actionable objects, such as the actionable objects described herein below in conjunction with FIGS. 3A, 3B, and 3C, to a user through a client device 220. Such actionable objects can include user-selectable hyperlinks, buttons, graphics, videos, images, or other application features that generate a signal that is processed by the application executing on the respective client device 220.

In embodiments, one or more client devices 220 can establish one or more communication sessions between the gaming system 205 and the one or more client devices 220. The one or more communication sessions can each include a channel or connection between the gaming system 205 and the one or more client devices 220. The one or more communication systems can each include an application session (e.g., virtual application), an execution session, a desktop session, a hosted desktop session, a terminal services session, a browser session, a remote desktop session, a URL session and/or a remote application session. Each communication session can include encrypted and/or secure sessions, which can include an encrypted file, encrypted data or traffic.

Each of the client devices 220 can be computing devices configured to communicate via the network 210 to access information resources, such as web pages via a web browser, or application resources via a native application executing on a client device 220. When accessing information resources, the client device can execute instructions (e.g., embedded in the native applications, in the information resources, etc.) that cause the client devices to display gaming application interfaces, such as the user interface described herein below in conjunction with FIGS. 3A-3C. The gaming application interfaces can be, for example, application interfaces that present different types of casino games, or other types of interactive video games. In general, video games include content (e.g., images, video, animations, graphics, audio, etc.) that is presented to a user via the input/output interfaces of a client device 220. In some implementations, a client device 220 can include an acceptor, which can accept or receive a physical item representative of a currency or credits (e.g., money, a payment card, physical tokens, physical gaming chips, etc.).

The application interfaces can, in some implementations, cause the client device 220 to communicate with the modules of the gaming system 205. For example, the instructions executing on a client device 220 (e.g., an application, etc.) can cause the client device 220 to request a generated game condition, which can be a number, criteria, or other bonus condition as described herein. Further, it should be understood that while FIG. 2 depicts a number of client devices 220 in communication with a gaming system 205 over a network, that any of the functionalities of the gaming system 205 can be implemented by a client device 220, and vice-versa. For example, in some implementations, a client device 220 can itself generate the bonus conditions as described herein.

In response to interaction with user interface elements, the client devices 220 can transmit information, such as account 270 information (e.g., changing account 270 parameters, changing login information, etc.), interaction information, selections of wager amounts, selections of gaming participation events, or other signals to the gaming system 205. In some implementations, a client device can transmit a request to initiate a gaming session. The request can include, for example, a request to play a particular game (e.g., can include a game identifier, etc.), which can include an indication to participate in a game having a bonus award. In some implementations, a client device 220 can transmit, during a play of a game, a signal to the gaming system 205 that indicates a desire to participate in an additional bonus opportunity for that game. The request can be a hypertext transfer protocol (HTTP or HTTPS) request message, a file transfer protocol message, an email message, a text message, or any other type of message that can be transmitted via the network 210.

In general, upon requesting a game, a client device 220 (or an application executing on the client device 220) can receive data relating to the requested game from the gaming system 205. The data relating to the requested game can include indications of a game state, which can be maintained by one or more of the components of the gaming system 205, as described herein. A game state can include one or more data structures that include any information related to a game state, such as current cards held by a user (e.g., in a blackjack or poker game, etc.), wager information, information about whether the user has indicated a desire to participate in additional bonus award opportunities, or other game state data described herein. The game state can include turn information, (e.g., which user has the current turn, how many game turns have elapsed, etc.). In some implementations, the indications of the game state can be received as a play of the game occurs (e.g., as the play is processed by the gaming system 205 according to the game instructions 280, etc.). The indications of the game state can include instructions that cause the client device 220 to display one or more indicia, such as cards, dice, blackjack tables, poker tables, bingo cards, or other types of gaming indicia or user interface elements. The client devices 220 can receive instructions from the gaming system 205 can cause the client device 220 to display one or more actionable objects, such as the actionable objects described herein below in conjunction with FIGS. 3A, 3B, and 3C.

As described herein, a client device 220 can receive one or more interactions with actionable objects presented on the display of the client device. Interactions can be tap interactions, click interactions, or other types of indications that a user is engaged with a particular user interface element. Upon detecting an interaction with a particular user interface element, the client device 220 can execute instructions (e.g., processor-readable code, a script, etc.) that cause the client device 220 to transmit an appropriate signal to the gaming system 205. A signal can include any information specified by the instructions associated with the particular actionable object with which the user interacted. The signals can include, for example, a request to engage in a specified game, a request to participate in an additional bonus opportunity, a request to advance the game state (e.g., hit/stay/split/double-down in blackjack, indications of cards to discard in poker, indications of which dice to roll in a dice game, indications that the user has stopped playing, etc.).

As described herein, a client device 220 and the gaming system 205 can exchange messages containing information that causes an interactive game to be displayed on the display of the client device 220. By interacting with the actionable objects presented on the display of the client device 220, the gaming system 205 can advance the state of the game, and transmit instructions to the client device that cause the client device to change the user interface in accordance with the game state (e.g., display additional cards, display more/fewer dice, display more/fewer actionable objects providing additional functionality, display more/fewer fields that allow the user to enter user information, display game outcomes, display wager amounts, display bonus award opportunity information such as numbers generated by the gaming system 205, etc.). In some implementations, the client device 220 can receive content for presentation on the display of the client device 220 in a streaming arrangement (e.g., content is streamed from the gaming system 205 using a streaming protocol, etc.).

The database 215 can be a computer-readable memory that can store or maintain any of the information described herein. The database 215 can maintain one or more data structures, which may contain, index, or otherwise store each of the values, pluralities, sets, variables, vectors, numbers, or thresholds described herein. The database 215 can be accessed using one or more memory addresses, index values, or identifiers of any item, structure, or region maintained in the database 215. The database 215 can be accessed by the components of the gaming system 205, or any other computing device described herein, via the network 210. In some implementations, the database 215 can be internal to the gaming system 205. In some implementations, the database 215 can exist external to the gaming system 205, and may be accessed via the network 210. The database 215 can be distributed across many different computer systems or storage elements, and may be accessed via the network 210 or a suitable computer bus interface. The gaming system 205 can store, in one or more regions of the memory of the gaming system 205, or in the database 215, the results of any or all computations, determinations, selections, identifications, generations, constructions, or calculations in one or more data structures indexed or identified with appropriate values. Any or all values stored in the database 215 may be accessed by any computing device described herein, such as the gaming system 205, to perform any of the functionalities or functions described herein. In some implementations, the database 215 can be similar to or include the storage 128 described herein above in conjunction with FIG. 1C. In some implementations, instead of being internal to the gaming system 205, the database 215 can form a part of a cloud computing system. In such implementations, the database 215 can be a distributed storage medium in a cloud computing system, and can be accessed by any of the components of the gaming system 205, by the one or more client devices 220 (e.g., via one or more user interfaces, etc.), or any other computing devices described herein.

The database 215 can store one or more accounts 270 associated with a user of a client device 220. The account 270 can be a user profile that includes information about a user and information about one or more of the client devices 220 used to access the gaming system 205 using the account 270. For example, identifiers of an account 270 can be used to access the functionality of the gaming system 205. The identifiers can include a username, a password, an e-mail address, a phone number, a personal identification number (PIN), a secret code-word, device identifiers for use in a two-factor authentication technique, among others. The account 270 can store information about wagers, games, and gaming events that are performed using the gaming system 205. The account 270 can store a credit balance, wager information (e.g., an amount of a wager, a timestamp associated with a wager, information about the presence of an indication to participate in a bonus opportunity using the wager, a client device identifier of a client device that was used to place the wager, etc.). The account 270 can store information about a client device used to access the gaming system 205 such as an IP address, a MAC address, a GUID, an account 270 name (e.g., the name of a user of the client device 220, etc.), device name, among others. In some implementations, an account 270 can be created by the gaming system 205 in response to an account 270 creation request transmitted by a client device 220. The account 270 creation request can include any of the account 270 information described herein.

The database 215 can store or maintain play information 275 associated with each of the one or more accounts 270. The play information 275 can include game state information for games previously or currently played by a client device 220 having a corresponding account 270. In some implementations, a client device 220 accessing the gaming system 205 may not be associated with an account 270. In such implementations, the gaming system 205 can automatically create an account 270 using an identifier of the client device 220 provided by the client device 220. The play information 275 can include information about previous wagers, actions, interactions, or other data provided by the client device 220 during the play of a game provided by the gaming system 205. The play information 275 can maintain a game state of the game as it is being played. As described herein, the game state can include one or more data structures that include any information related to a game state, such as current cards held by a user (e.g., in a blackjack or poker game, etc.), wager information, information about whether the user has indicated a desire to participate in additional bonus award opportunities, or other game state data described herein. The game state can include turn information, (e.g., which user has the current turn, how many game turns have elapsed, etc.). In some implementations, the indications of the game state can be received as a play of the game occurs (e.g., as the play is processed by the gaming system 205 according to the game instructions 280, etc.). The game state can include options that a user may take at each portion of a game, and any actions (e.g., interactions, pausing/waiting for a particular duration at stored timestamps, etc.) the client device 220 takes in response to said options.

The database 215 can store or maintain game instructions 280. The game instructions 280 can include instructions to play each of the games described herein (e.g., blackjack, poker, rummy, craps, sic bo, Klondike, any other game, etc.). The game instructions 280 can include one or more game events that occur in response to a particular game state. In short, the game instructions 280 can include instructions to play a game from start to finish, by streaming gaming content to each of the client devices 220 that initiate play of a particular game. The game instructions 280 can be stored in one or more data structures that are indexed by a game name (e.g., blackjack, poker, rummy, craps, sic bo, Klondike, any other game, etc.). The game instructions 280 can be processor executable instructions that cause the gaming system 205 to provide one or more games to a client device 220 via a communication session. In some implementations, the gaming instructions can include artificial intelligence models (e.g., machine learning models, neural network, decision trees, ruled-based lookup table, etc.) that cause the gaming system 205 to play an opposing entity to a user of one of the games in the game instructions 280. For example, the artificial intelligence model can provide a simulated dealer in a blackjack game, a simulated user in a poker game, or other simulated users, dealers, or game entities.

The game instructions 280 can include odds information, which can be stored as probability values of certain in-game events occurring. The odds information can be altered based on actions taken by the user, or the odds information can effectuate particular expected outcome (e.g., an expected value of user loss, an expected value of user win, etc.). The game instructions 280 can cause the game state in the play information 275 to be updated as a game is played by a client device 220. In some implementations, the game instructions 280 can update the odds information in response to an indication (e.g., as stored in the play information 275, etc.) to participate in an additional bonus opportunity. The game instructions 280 can include descriptions of game events or game criteria that can activate (e.g., provide, etc.) a bonus award. For example, in a blackjack game, a game event that provides a bonus award can be a target hand value (e.g., the values of the cards in a user hand equal a target value, etc.). The target hand value can be determined by the gaming system 205, as described herein. In a poker game, the target hand value can be a predetermined poker rank (e.g., a high card, a pair, a two-pair, three of a kind, a straight, a flush, a full house, four of a kind, a straight flush, a royal flush, etc.). In a rummy game, the game event can be, for example, one or more specified cards in a winning hand. In a dice game (e.g., craps, sic bo, Klondike, etc.), the game event can be a particular roll value (e.g., the values represented by dice after rolling the dice, etc.). The game instructions 280 can specify the conditions under which the user can be awarded with the bonus award when the condition is met (e.g., at game termination, on user win, on user loss, etc.). Each of the components of the gaming system 205 can access, update, or modify the accounts 270, the play information 275, or the game instructions 280, to carry out functionalities described herein.

Referring now to the operations of the gaming system 205, the wager communicator 230 can receive an indication of a wager on a play of a game. The indication can be transmitted by one or more of the client devices 220, and can include an indication of an account 270 with which to use for the functionalities related to the game (e.g., placing wagers using earned credits, purchasing additional credits, etc.). The indication can be a request to play a game, and can include an identifier of a particular game to play. In some implementations, the wager communicator 230 can provide the client device 220 with instructions to display one or more games to play, allowing the user to select a game from the list. In response to an interaction indicating a selection, the client device 220 can transmit a signal identifying a game. Using the game selection, the wager communicator can communicate a second user interface (e.g., similar to the user interface depicted in FIG. 3A, etc.) that prompts the user to select a wager amount.

The selected game can be, for example, a card based game, which can include (but is not limited to) poker, blackjack, or rummy, among others. In some implementations, the game can be a dice-based game, which can include (but is not limited to) a game of craps, sic bo, or Klondike. In some implementations, the wager communicator 230 can receive, as a part of the request to play the selected game, a request to participate in a bonus opportunity corresponding to a bonus award. For example, the wager communicator 230 can present one or more actionable objects on the user interface of the client device 220, that when actuated, cause the client device 220 to transmit a signal to the wager communicator 230 that selects the bonus opportunity for one or more plays of the selected game. A play of a game can be a single "round" or play-through of a game to a termination condition (e.g., a condition after which the user has won or lost the wager, etc.).

Once the game or the bonus opportunity have been selected, the wager communicator 230 can provide a second user interface (e.g., similar to the user interface depicted in FIG. 3A, etc.) that prompts the user to select a wager amount. The wager amount can be a specified amount of credits, such as 1, 5, 25, 100, 500, or 1000 credits. In some implementations, the user can specify the number of credits used in the game (e.g., via one or more user interface elements, etc.) via the user interface. Once the wager is selected using the user interface, the client device 220 can transmit a request to place the wager for the play of the game. In some implementations, the user interface can prompt the user to provide an additional wager (e.g., a bonus wager, etc.) to participate in the bonus opportunity. In some implementations, the user can indicate that they wish to participate in the bonus opportunity by placing a wager that is greater than a threshold wager amount. An example of a user interface that allows a user to place a wager for a blackjack game is described herein below in conjunction with FIG. 3A.

Figure 3A:
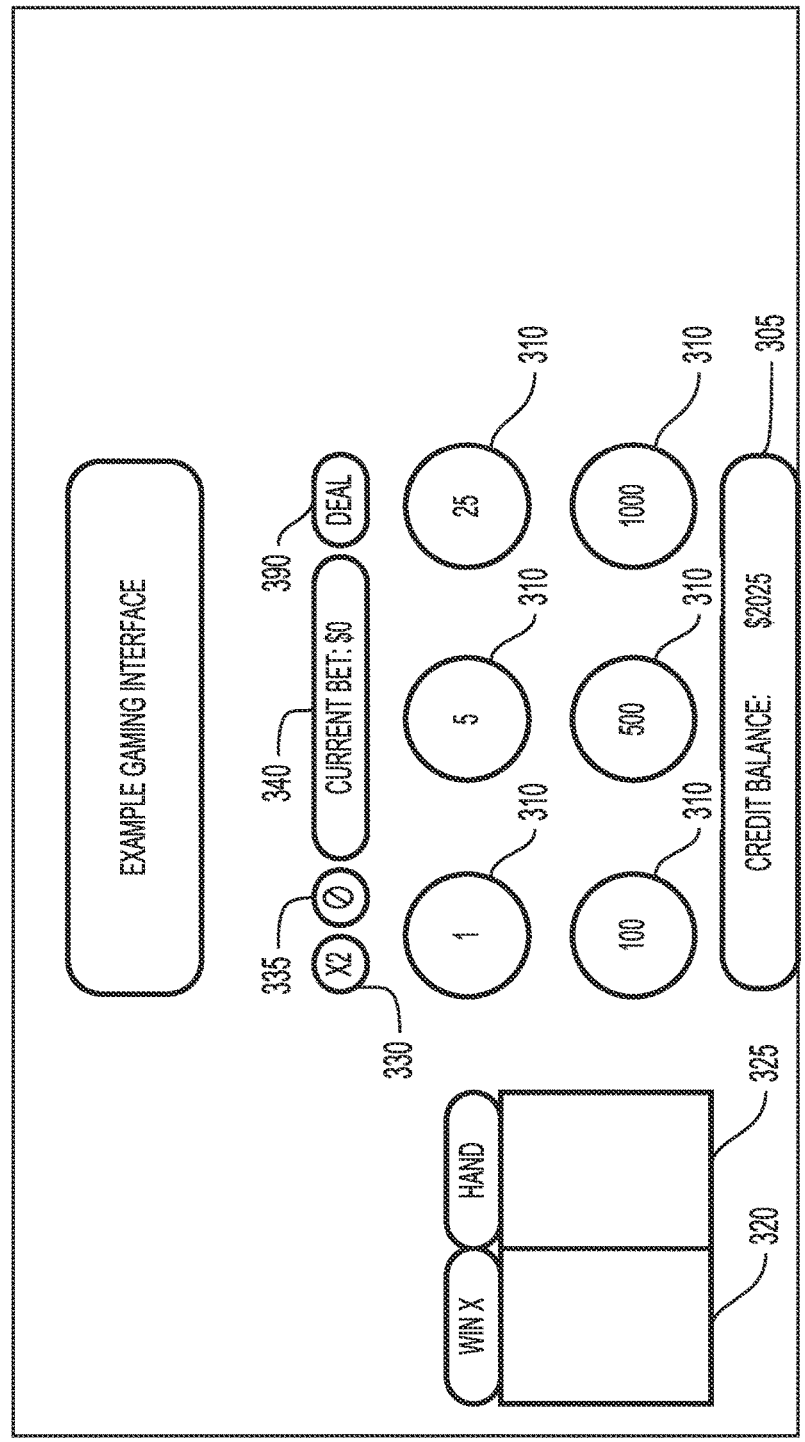
FIGS. 3A, 3B, and 3C illustrate example user interfaces that display information from the gaming system depicted in FIG. 2, in accordance with one or more implementations.

Referring briefly now to FIG. 3A depicted is an example gaming interface 300A that can be displayed on a client device, such as the client device 220, or another computing device described herein. As shown in the figure, the gaming interface 300A can include wagering actionable objects 310 that each provide a corresponding wager amount. The current bet (e.g., the wager amount, etc.) is shown in the current bet field 340. The user can double the current bet by interacting with the "X2" multiplier actionable object 330, and can clear the bet (e.g., reset to zero, etc.) by interacting with the Ø actionable object 335. The credit balance of the user (e.g., the credit balance indicated in the account 270 of the user, etc.) can be displayed in the credit balance field 305. Fields that correspond to certain game elements, such as a multiplier value field 320 or the target value field 325 can be displayed in the user interface, indicating that the user is participating in a game having a bonus award. The user can indicate that the user is ready to play the game (e.g., and provide the wager) by actuating the "deal" actionable object 390. It should be understood that the labels, locations, and depictions of the gaming interface 300A are purely example interface elements, and other configurations including other content, such as depictions of gaming tables (e.g., poker tables, blackjack tables, craps tables, etc.) are possible. An interaction with the "DEAL" actionable object 390 can cause the client device 220 to transmit the indication of the wager to the gaming system 205, as described herein. After which, the credit balance can be deducted, and the gaming system 205 can continue playing the game according to the game state in the play information 275.

Referring back now to FIG. 2, the credit manager 235 can decrease a credit balance based on the wager. Decreasing the credit balance can include subtracting the wager amount from the total credits available to the account 270. If the wager amount exceeds the total credits available, the credit manager 235 can prompt the user to access more credits (e.g., via purchase, coupons, or using one or more codes that unlock credits, etc.). In some implementations, the game can implement a free-play mode, in which the user has unlimited credits (or can replenish the total credit amount indefinitely, etc.). The credit manager can compare the wager amount to the credit balance of the account 270 to determine whether the wager amount exceeds the credit balance. If the credit balance is not exceeded, the credit manager 235 can cause the game to commence (e.g., set the game state in the play information 275 to an initial state, etc.). If the game includes a bonus opportunity, or if the user has indicated (as described herein) that the game should include the bonus opportunity, the credit manager 235 can send a signal to the value determiner 240 to generate values for the bonus opportunity.

The value determiner 240 can determine a first number as a target value and a second number as a modifier. In some implementations, the value determiner 240 can determine the first number as the target value and the second number as the modifier in response to the indication of the wager received from a client device 220, or in response to the indication to activate the bonus opportunity. The value determiner 240 can determine values (e.g., numbers, conditions, etc.) that award a bonus amount. The bonus amount awarded can also be determined by the value determiner 240. The value determiner 240 can determine a first value as a target value (e.g., a poker rank in a final hand, or a total card value amount in a blackjack game, a total dice value indicated by one or more dice after a roll, etc.) As such, the value determiner 240 can determine said values based on the game selected by the user. For example, in a poker game, the value determiner can determine a predetermined rank as the target value, that when exceeded or matched, causes the total wager amount to be modified (e.g., multiplied, etc.) by the second number. In some implementations, if the user provided a wager that exceeds a bonus participation threshold, the value determiner 240 can determine the target value based on the bonus participation threshold. For example, the target value can be randomly selected from a range of values corresponding to a bonus participation threshold. Multiple bonus participation thresholds can be associated with different ranges of values. In some implementations, the target value can be selected from a range of values associated with the wager amount provided by the user. In some implementations, the target value can be selected as a range of target values.

The second number can be a randomly generated number within a predetermined range. For example, in some implementations, the second number can be randomly selected from a range of values corresponding to a bonus participation threshold. Multiple bonus participation thresholds can be associated with different ranges of values. In some implementations, the second number can be selected from a range of values associated with the wager amount provided by the user. The second number can be an integer value or a floating point value. If the game is a blackjack game, the target value can be a total card value in the user hand that, when matched, causes the wager to be multiplied by the second number. Likewise, in a dice game such as craps, the target value can be certain die faces that will be face up after a roll, or can be a total value represented by the dice after a roll. The value determiner 240 can determine the first number or the second number using a random number generator, such as a pseudo-random number generator. In some implementations, the value determiner 240 can determine the first number and the second number during the play of the game, in response to an interaction at the user interface displayed on the client device 220 indicating that the user intends to engage with the bonus opportunity.

In some implementations, the value determiner 240 can select the second number from a set of predetermined numbers in accordance with a policy. The policy can indicate that the predetermined numbers are weighted equally with respect to selection probability (e.g., each of the predetermined numbers has an equal probability of being randomly selected, etc.). In some implementations, the policy can indicate that each of the set of predetermined numbers is associated with a corresponding selection probability, such that the sum of the selection probabilities of each of the set of predetermined numbers sums to one. In such implementations, each of the set of predetermined numbers can have a different selection probability. In some implementations, the value determiner 240 can randomly determine the second number after the play of the game is complete, and can select the second number based on the result of the play. For example, if the user wins the play of the game, the value determiner 240 can randomly generate and display the second number for the user. In some implementations, the value determiner 240 can generate (e.g., randomly, or as otherwise described herein, etc.) the second number after the play of the game is complete, regardless of game outcome (e.g., whether the user loses or wins, etc.).

The game event monitor 245 can monitor a play of the game, and can determine game start and game termination conditions. In implementations where the game is a blackjack game, the game event monitor 245 can monitor a total value of a user hand in response to user hit selections. For example, during the blackjack game, the gaming system 205 can access the game instructions 280 to conduct the blackjack game according to the rules of blackjack. When the user requests a hit option, an additional card can be drawn into the players hand, which can be presented as part of the user hand in the user interface (e.g., similar to the interface depicted in FIG. 3B). The game event monitor 245 can monitor the player hand to determine whether the player has busted, or exceeded a hand value (e.g., twenty one in blackjack, etc.). To do so, the game event monitor 245 can identify each card included in the user hand, and determine a total by summing each a value corresponding to each card. Based on the value of the cards in the player hand, the game event monitor 245 can determine a game termination condition (e.g., the total hand value exceeds the predetermined value, etc.). The game event monitor 245 can also determine the game termination condition in a blackjack game if the user interacts with the "stand" user interface object, indicating the user intends to hold the current hand against the dealer according to the rules of blackjack.

Likewise, in other game types, such as a poker game, the game event monitor 245 can monitor the player hand by determining the rank of the player hand. The rank of the player hand can include any of the standard poker ranks, including a high card, a pair, a two-pair, three of a kind, a straight, a flush, a full house, four of a kind, a straight flush, or a royal flush. Other poker games, with more or fewer cards, can include additional ranks, each of which can be specified in the game instructions 280 for the particular poker game. The game event monitor 245 can monitor the rank of the cards in the user hand by comparing the cards to one or more poker ranks specified in the game instructions 280. The game event monitor 245 can assign the highest rank to the user hand (e.g., three of a kind instead of a pair, etc.). An example user interface provided by the gaming system 205 during a hand of blackjack is described herein below in conjunction with FIG. 3B.

Figure 3B:
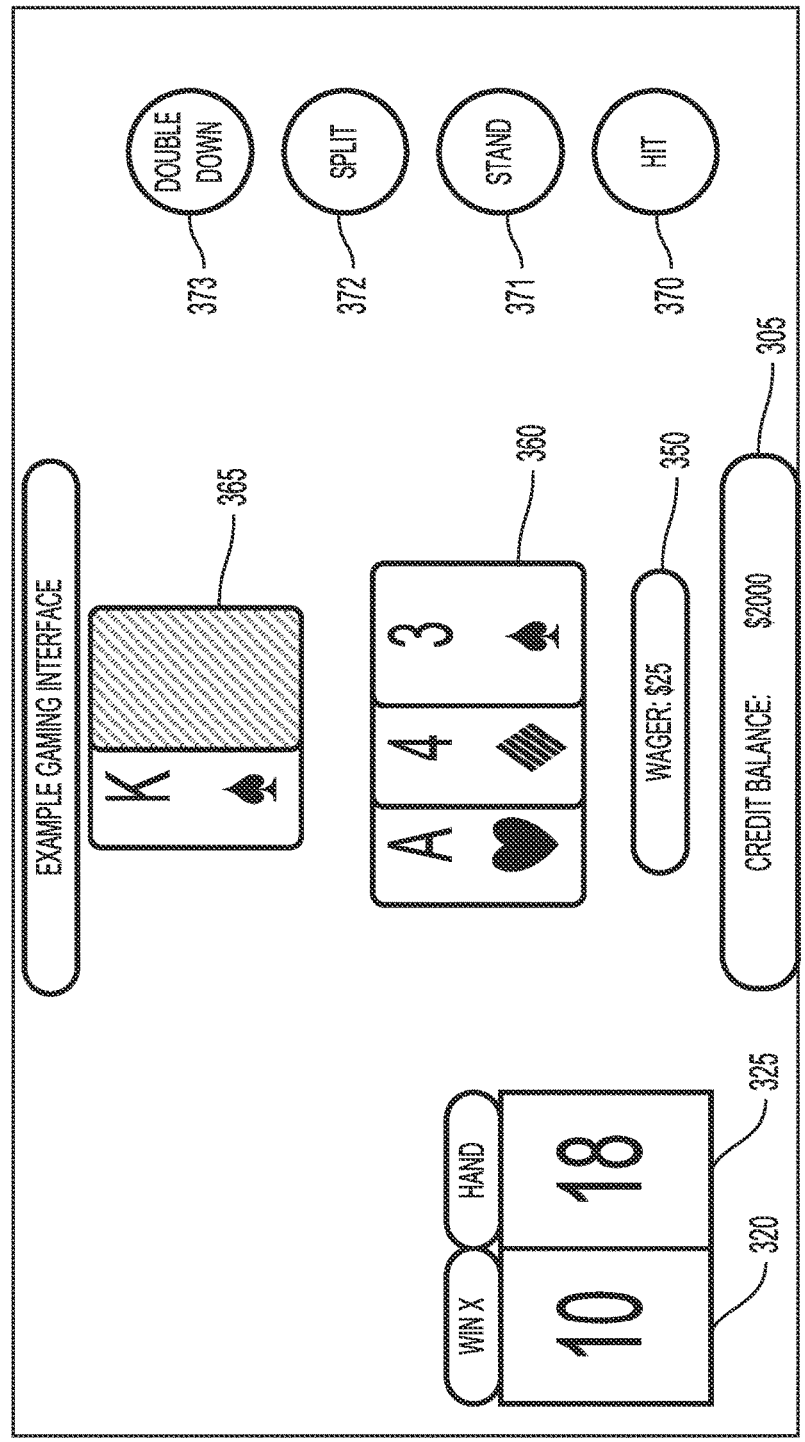

Referring briefly now to FIG. 3B, depicted is an example gaming interface 300B provided by the gaming system 205. The gaming interface 300B can be displayed after the player has placed a wager on the game, which is depicted in the wager field 350. As shown, the credit balance depicted in the credit balance field 305 has decreased from what was depicted in FIG. 3A by the wager amount shown in the wager field 350. Likewise, each of the multiplier value field 320 and the target value field 325 have been populated with the second number and the first number, respectively, which are determined by the value determiner 240. As described herein above, the multiplier value can be an amount by which the wager is modified to generate a bonus award, and the value indicated in the target value field 325 can indicate a condition that must occur to receive the bonus award. In the gaming interface 300B, the modifier value is ten (e.g., a multiplier of ten, etc.), and the target hand value (e.g., the total sum of each card value, etc.) is equal to eighteen.

The player hand is indicated as the face-up cards 360, and the dealer hand (e.g., with one card face down, according to the rules of blackjack) is shown as the cards 365. Actionable objects 370, 371, 372, and 373 are depicted on the right-hand portion of the gaming interface 300B. The actionable objects 370, 371, 372, and 373 can each correspond to a player action during the play of the game. For example, the hit button 370 can cause the client device 220 to transmit a signal to the gaming system 205, causing the gaming system 205 to provide an additional card to the user hand in accordance with the instructions in the game instructions 280. The stand button 371 can cause the client device 220 to transmit a signal to the gaming system 205, causing the gaming system 205 to deal cards to the dealer until a game termination condition is reached (e.g., the dealer busts, has a hand value that is greater than a predetermined threshold, or has a hand value that is greater than the user hand value, etc.). The split button 372 can be activated (e.g., selectable, etc.) when the initial user hand includes two cards of the same value (e.g., a pair of twos, a pair of threes, etc.). An interaction with the split button 372 can cause the client device 220 to transmit a signal to the gaming system 205, causing the gaming system 205 to split the user hand into two separate user hands and play them concurrently, in accordance with the game instructions 280. The double down button 373 can be activated when the user is dealt an initial hand, and when actuated, can cause the client device 220 to transmit a signal to the gaming system 205, causing the gaming system 205 to double the wager of the user, deal the user one additional card, and cause the user to stand for the rest of the play, in accordance with the game instructions 280. These functions can be provided until a game terminating condition occurs, such as a player loss or a player win, or any other type of termination condition described herein.

Referring back now to FIG. 2, upon a game terminating event, the game award determiner 250 can determine an initial award amount based on the wager and a result of the play independent of the first number. The game award determiner 250 can determine the initial award based on the game being played. For example, if the game is blackjack, the initial award amount can be a three-to-two payout option, where the award is equal to three-times half their wager amount. In some implementations, the initial award amount can be a two-to-one payout option, where the award is equal to two-times the wager amount. In some implementations, the payout amount and the payout rules can be stored in one or more pay-tables or pay data structures stored in the game instructions 280. For example, if the game is a poker game, the amount won may correspond to an amount in a pot, or collective bet of one or more other users or simulated users. In some implementations, if the game is a poker game, the amount won may correspond to an amount specified in a pay-table that is indexed by poker hand rank (e.g., each poker hand corresponds to an award amount, or an award multiplier that is used to multiply the wager, etc.). An example pay table is included below in Table 1, in which "X to 1" indicates a multiplier value of "X" for the corresponding poker rank:

TABLE 1

| Poker Rank | Bonus Award Modifier |
| --- | --- |
| Royal Flush | 100 to 1 |
| Straight Flush | 40 to 1 |
| Three of a Kind | 30 to 1 |
| Straight | 6 to 1 |
| Flush | 3 to 1 |
| Pair | 1 to 1 |

Although only a few example poker ranks are shown above in Table 1, it should be understood that other poker ranks, or game conditions, along with other bonus award modifiers, are possible.

The game event monitor 245 can determine that a game event of the play satisfies a bonus award condition based on the first number (e.g., the target value, etc.). In some implementations, the game event monitor 245 checks the play information to determine that the user is engaging in the bonus opportunity, and then determines whether the game event satisfies the bonus award condition. The game event monitor 245 can compare a user status of the game (e.g., a user hand in a blackjack, poker, or rummy game, a dice roll in a dice game, etc.) to the target value (e.g., the first number). If the user status in the game matches the target condition, the game event monitor 245 can determine that the game event (e.g., the user hand, etc.) satisfies the bonus award condition. In some implementations, the user status must also trigger a winning game condition to satisfy the bonus award condition, in accordance with the game instructions 280. In some implementations, the user status in the game need not necessarily match the target value, but can instead be within a range of target values. In some implementations, the user status satisfies the bonus award condition if the user status exceeds (or is greater than or equal to, etc.) the target value. In some implementations, the user status satisfies the bonus award condition if the user status exceeds (or is greater than or equal to, etc.) the target value.

Once it is determined that a game event satisfies the bonus award condition based on the first number, the bonus award determiner 255 can compute a bonus award based on the second number and the initial award amount. The bonus award determiner 255 can, for example, compute the bonus award by multiplying the wager and the second number. In some implementations, the bonus award determiner 255 can compute the bonus award by performing a lookup in a bonus pay-table, and multiplying the value in the bonus pay-table corresponding to the target value by the second number. In some implementations, addition can be used in place of subtraction. In some implementations, the bonus award determiner 255 can generate a third number, in response to the game event satisfying the bonus award condition, and compute the bonus award as the third number multiplied by (or in some implementations, added to) the second number. The bonus award determiner 255 can store the bonus award value, along with any of the information described herein, in one or more data structures in the account 270 data corresponding to the user. In some implementations, if a bonus wager is provided in addition to a normal wager, the bonus wager can be used as described herein above to determine the bonus award amount, instead of the normal wager.

The credit manager 235 can cause the credit balance to increase based on the computed bonus award or the initial award amount. In some implementations, the credit manager 235 can cause the credit balance to increase only by the bonus award amount, rather than the initial award amount or a combination of the initial award amount and the bonus award amount. In some implementations, the credit manager 235 can cause the credit balance to increase by a sum of the initial award amount and the bonus award amount. If the bonus award amount is zero (e.g., the bonus award condition was not met, etc.), the credit manager 235 can increase the credit balance only by the initial award amount. The credit manager 235 can store the updated credit amount in the account 270 corresponding to the user playing the game. In some implementations, the credit manager 235 can store a record of the award amount(s) won, in association with one or more timestamps corresponding to the time the award amount(s) were won, in the account 270 of the user. An example user interface showing an increased credit balance from a bonus award and an initial award is described herein below in conjunction with FIG. 3C.

Figure 3C:
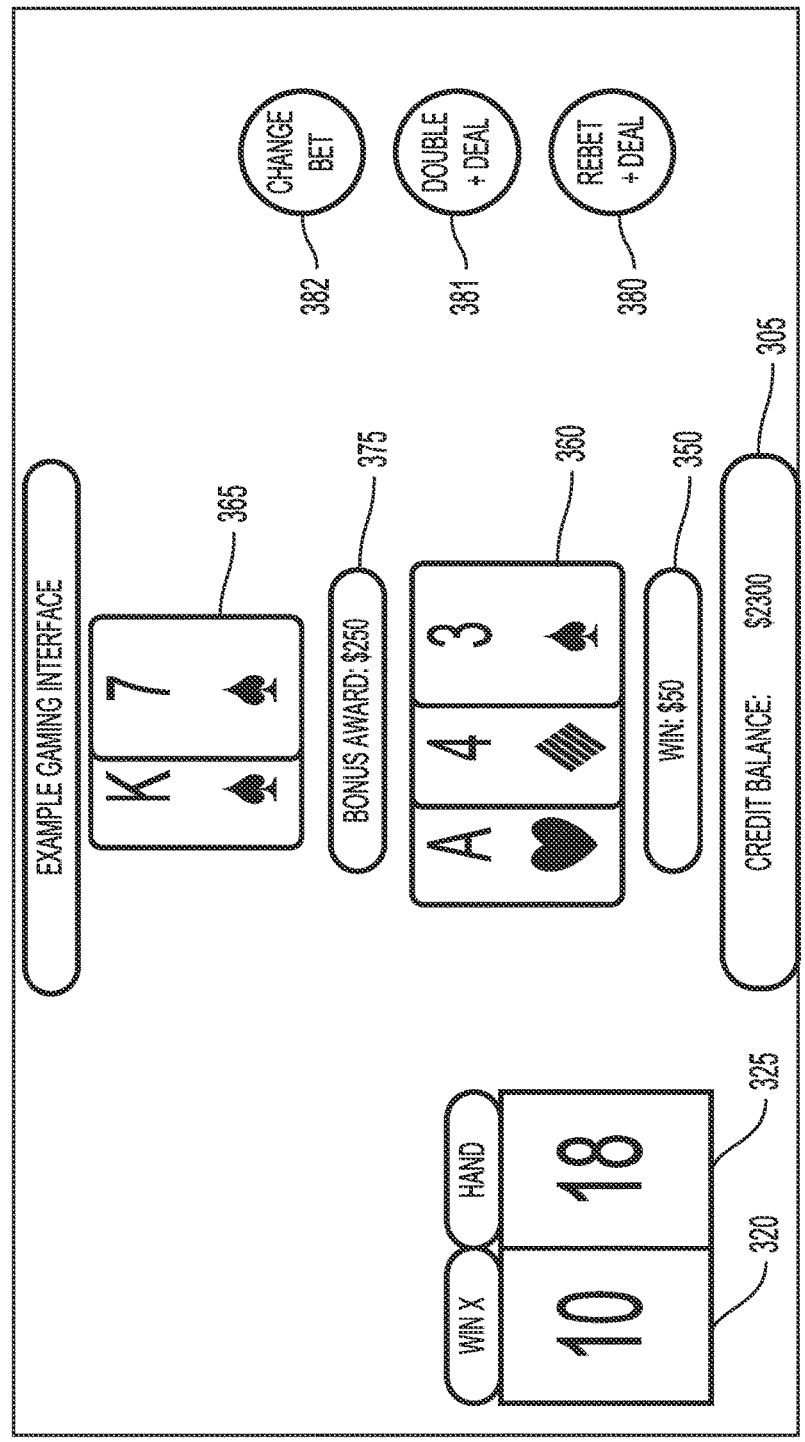

Referring briefly now to FIG. 3C, depicted is an example gaming interface 300C provided by the gaming system 205. The gaming interface 300C can be provided in response to a game event satisfying a bonus award condition, and the player beating the dealer hand 365. The reference numbers in the gaming interface 300C correspond to those described herein above in conjunction with FIG. 3B. As depicted, the wager field 350 has been transformed into a winning amount field that displays the initial award amount computed by the game award determiner 250. An additional indicator field, the bonus award field 375, depicts the bonus award amount. As shown, the bonus award amount is equal to the first value (shown in the corresponding multiplier field 320) multiplied by the wager value, which as described above is $25. Thus, as shown in the credit balance field 305, the credit balance has been increased by $300 to $2300, with $50 being from the initial award amount, and $250 being the bonus award amount. Because the play of the game has completed, the actionable objects 370, 371, 372, and 373, which coordinate game play, have been replaced with the actionable objects 380, 381, and 382, which can coordinate replaying the game (e.g., and providing an additional wager). The actionable object 380, when actuated, causes the client device 220 to send a signal to the gaming system 205, causing the gaming system 205 to provide the same wager and initiate another play of the same game. The actionable object 381, when actuated, causes the client device 220 to send a signal to the gaming system 205, causing the gaming system 205 to provide the double the previous wager and initiate another play of the same game. The actionable object 381, when actuated, causes the client device 220 to send a signal to the gaming system 205, causing the gaming system 205 to provide the present the gaming interface 300A depicted in FIG. 3A, allowing the user to change the wager amount.

Figure 4:
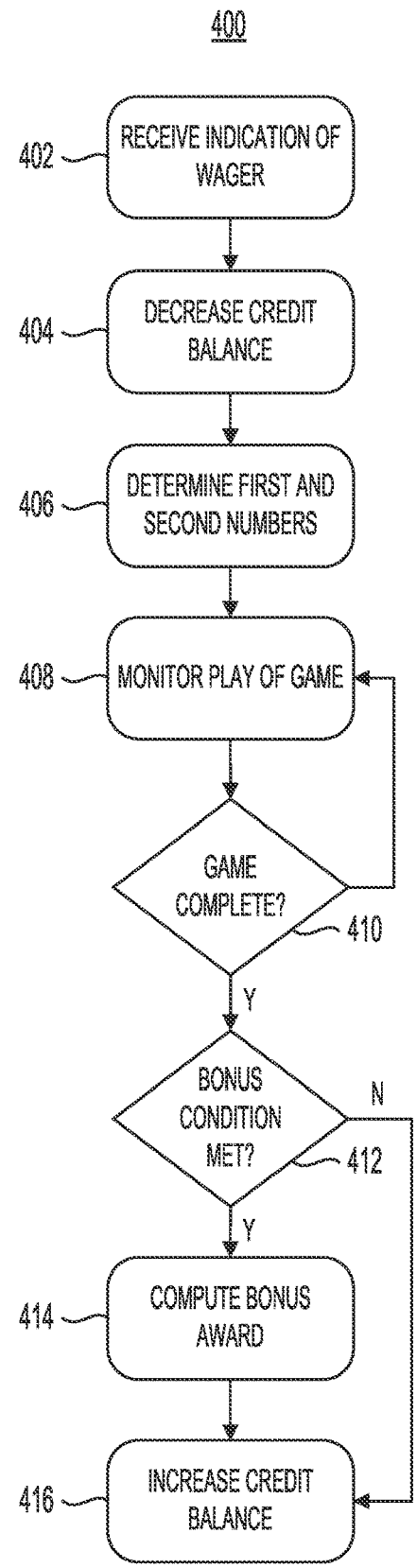
FIG. 4 illustrates an example flow diagram of a method for providing gaming system functionalities with bonus award opportunities, in accordance with one or more implementations.

Referring now to FIG. 4, depicted is an illustrative flow diagram of a method 400 for providing games having additional bonus features. The method 400 can be executed, performed, or otherwise carried out by the gaming system 205, the computer system 100 described herein in conjunction with FIGS. 1A-1D, or any other computing devices described herein. In brief overview of the method 400, the gaming system (e.g., the gaming system 205, etc.) can receive an indication of a wager (STEP 402), decrease a credit balance (STEP 404), determine first and second number (STEP 406), monitor play of the game (STEP 408), determine whether the play of the game is complete (STEP 410), determine whether a bonus condition has been met (STEP 412), compute a bonus award (STEP 414), and increase a credit balance (STEP 416).

In further detail of the method 400, the gaming system (e.g., the gaming system 205, etc.) can receive an indication of a wager (STEP 402). The wager can be in indication received from a client device (e.g., a client device 220, etc.) that a user intends to play a game provided by the gaming system. The indication can include an indication of an account with which to use for the functionalities related to the game (e.g., placing wagers using earned credits, purchasing additional credits, etc.). The indication can be a request to play a game, and can include an identifier of a particular game to play. In some implementations, the gaming system can provide the client device with instructions to display one or more games to play, allowing the user to select a game from the list. In response to an interaction indicating a selection, the client device can transmit a signal identifying a game. Using the game selection, the gaming system can communicate a second user interface (e.g., similar to the user interface depicted in FIG. 3A, etc.) that prompts the user to select a wager amount.

The selected game can be, for example, a card based game, which can include (but is not limited to) poker, blackjack, or rummy, among others. In some implementations, the game can be a dice-based game, which can include (but is not limited to) a game of craps, sic bo, or Klondike. In some implementations, the gaming system can receive, as a part of the request to play the selected game, a request to participate in a bonus opportunity corresponding to a bonus award. For example, the gaming system can present one or more actionable objects on the user interface of the client device, that when actuated, cause the client device to transmit a signal to the gaming system that selects the bonus opportunity for one or more plays of the selected game. A play of a game can be a single "round" or play-through of a game to a termination condition (e.g., a condition after which the user has won or lost the wager, etc.).

Once the game or the bonus opportunity have been selected, the gaming system can provide a second user interface (e.g., similar to the user interface depicted in FIG. 3A, etc.) that prompts the user to select a wager amount. The wager amount can be a specified amount of credits, such as 1, 5, 25, 100, 500, or 1000 credits. In some implementations, the user can specify the number of credits used in the game (e.g., via one or more user interface elements, etc.) via the user interface. Once the wager is selected using the user interface, the client device can transmit a request to place the wager for the play of the game. In some implementations, the user interface can prompt the user to provide an additional wager (e.g., a bonus wager, etc.) to participate in the bonus opportunity. In some implementations, the user can indicate that they wish to participate in the bonus opportunity by placing a wager that is greater than a threshold wager amount.

The gaming system can decrease a credit balance (STEP 404). The credit balance can be decreased based on the wager. Decreasing the credit balance can include subtracting the wager amount from the total credits available to an account (e.g., an account 270, etc.). If the wager amount exceeds the total credits available, the gaming system can prompt the user to access more credits (e.g., via purchase, coupons, or using one or more codes that unlock credits, etc.). In some implementations, the game can implement a free-play mode, in which the user has unlimited credits (or can replenish the total credit amount indefinitely, etc.). The gaming system can compare the wager amount to the credit balance of the account to determine whether the wager amount exceeds the credit balance. If the credit balance is not exceeded, the gaming system can cause the game to commence (e.g., set the game state in the play information 275 to an initial state, etc.). If the game includes a bonus opportunity, or if the user has indicated (as described herein) that the game should include the bonus opportunity, the gaming system can generate values for the bonus opportunity.

The gaming system can determine first and second number (STEP 406). The gaming system can determine a first number as a target value and a second number as a modifier. In some implementations, the gaming system can determine the first number as the target value and the second number as the modifier in response to the indication of the wager received from a client device, or in response to the indication to activate the bonus opportunity. The gaming system can determine values (e.g., numbers, conditions, etc.) that award a bonus amount. The bonus amount awarded can also be determined by the gaming system. The gaming system can determine a first value as a target value (e.g., a poker rank in a final hand, or a total card value amount in a blackjack game, a total dice value indicated by one or more dice after a roll, etc.) As such, the gaming system can determine said values based on the game selected by the user. For example, in a poker game, the gaming system can determine a predetermined rank as the target value, that when exceeded or matched, causes the total wager amount to be modified (e.g., multiplied, etc.) by the second number. In some implementations, if the user provided a wager that exceeds a bonus participation threshold, the gaming system can determine the target value based on the bonus participation threshold. For example, the target value can be randomly selected from a range of values corresponding to a bonus participation threshold. Multiple bonus participation thresholds can be associated with different ranges of values. In some implementations, the target value can be selected from a range of values associated with the wager amount provided by the user. In some implementations, the target value can be selected as a range of target values.

The second number can be a randomly generated number within a predetermined range. For example, in some implementations, the second number can be randomly selected from a range of values corresponding to a bonus participation threshold. Multiple bonus participation thresholds can be associated with different ranges of values. In some implementations, the second number can be selected from a range of values associated with the wager amount provided by the user. The second number can be an integer value or a floating point value. If the game is a blackjack game, the target value can be a total card value in the user hand that, when matched, causes the wager to be multiplied by the second number. Likewise, in a dice game such as craps, the target value can be certain die faces that will be face up after a roll, or can be a total value represented by the dice after a roll. The gaming system can determine the first number or the second number using a random number generator, such as a pseudo-random number generator. In some implementations, the gaming system can determine the first number and the second number during the play of the game, in response to an interaction at the user interface displayed on the client device indicating that the user intends to engage with the bonus opportunity.

In some implementations, the gaming system can select the second number from a set of predetermined numbers in accordance with a policy. The policy can indicate that the predetermined numbers are weighted equally with respect to selection probability (e.g., each of the predetermined numbers has an equal probability of being randomly selected, etc.). In some implementations, the policy can indicate that each of the set of predetermined numbers is associated with a corresponding selection probability, such that the sum of the selection probabilities of each of the set of predetermined numbers sums to one. In such implementations, each of the set of predetermined numbers can have a different selection probability. In some implementations, the gaming system can randomly determine the second number after the play of the game is complete, and can the select second number based on the result of the play. For example, if the user wins the play of the game, the gaming system can randomly generate and display the second number for the user The gaming system can monitor play of the game (STEP 408). The gaming system can determine game start and game termination conditions. In implementations where the game is a blackjack game, the gaming system can monitor a total value of a user hand in response to user hit selections. For example, during the blackjack game, the gaming system can access the game instructions (e.g., the game instructions 280, etc.) to conduct the blackjack game according to the rules of blackjack. When the user requests a hit option, an additional card can be drawn into the players hand, which can be presented as part of the user hand in the user interface (e.g., similar to the interface depicted in FIG. 3B). The gaming system can monitor the player hand to determine whether the player has busted, or exceeded a hand value (e.g., twenty one in blackjack, etc.). To do so, the gaming system can identify each card included in the user hand, and determine a total by summing each a value corresponding to each card. Based on the value of the cards in the player hand, the gaming system can determine a game termination condition (e.g., the total hand value exceeds the predetermined value, etc.). The gaming system can also determine the game termination condition in a blackjack game if the user interacts with the "stand" user interface object, indicating the user intends to hold the current hand against the dealer according to the rules of blackjack.

Likewise, in other game types, such as a poker game, the gaming system can monitor the player hand by determining the rank of the player hand. The rank of the player hand can include any of the standard poker ranks, including a high card, a pair, a two-pair, three of a kind, a straight, a flush, a full house, four of a kind, a straight flush, or a royal flush. Other poker games, with more or fewer cards, can include additional ranks, each of which can be specified in the game instructions for the particular poker game. The gaming system can monitor the rank of the cards in the user hand by comparing the cards to one or more poker ranks specified in the game instructions. The gaming system can assign the highest rank to the user hand (e.g., three of a kind instead of a pair, etc.). The gaming system can monitor events of the game (e.g., actions taken by the user, etc.), and store identifiers of those events in play information (e.g., the play information 275, etc.). In some implementation, the gaming system can update the game state in the play information in accordance with the game instructions.

The gaming system can determine whether the play of the game is complete (STEP 410). The gaming system can determine that the play (e.g., round, hand, etc.) of a game is complete by detecting a game termination condition in accordance with the game rules, as described in STEP 408. In some implementations, the gaming system can detect the game is complete by comparing the game state in the play information to a game termination state. If the game state matches the termination state, the game can be complete. In some implementations, the gaming system can determine that the game is complete when one or more instructions in the game instructions are executed in response to a game termination condition. If the gaming system determines that the play of the game is complete, the gaming system can proceed to execute STEP 412 of the method 400. If the gaming system determines that the play of the game is not yet complete, the gaming system can continue to monitor the game as it is played in STEP 410 of the method 400.

In some implementations, if the gaming system determines that the play of the game is complete, and prior to executing STEP 412, the gaming system can determine an initial award amount based on the wager and a result of the play independent of the first number. The gaming system can determine the initial award based on the game being played. For example, if the game is blackjack, the initial award amount can be a three-to-two payout option, where the award is equal to three-times half their wager amount. In some implementations, the initial award amount can be a two-to-one payout option, where the award is equal to two-times the wager amount. In some implementations, the payout amount and the payout rules can be stored in one or more pay-tables or pay data structures stored in the game instructions. For example, if the game is a poker game, the amount won may correspond to an amount in a pot, or collective bet of one or more other users or simulated users. In some implementations, if the game is a poker game, the amount won may correspond to an amount specified in a pay-table that is indexed by poker hand rank (e.g., each poker hand corresponds to an award amount, or an award multiplier that is used to multiply the wager, etc.). After computing the initial award, the gaming system can execute STEP 412.

The gaming system can determine whether a bonus condition has been met (STEP 412). To do so, the gaming system can determine that the game event of the play satisfies a bonus award condition based on the first number (e.g., the target value, etc.). In some implementations, the gaming system checks the play information to determine that the user is engaging in the bonus opportunity, and then determines whether the game event satisfies the bonus award condition. The gaming system can compare a user status of the game (e.g., a user hand in a blackjack, poker, or rummy game, a dice roll in a dice game, etc.) to the target value (e.g., the first number). If the user status in the game matches the target condition, the gaming system can determine that the game event (e.g., the user hand, etc.) satisfies the bonus award condition. In some implementations, the user status must also trigger a winning game condition to satisfy the bonus award condition, in accordance with the game instructions 280. In some implementations, the user status in the game need not necessarily match the target value, but can instead be within a range of target values. In some implementations, the user status satisfies the bonus award condition if the user status exceeds (or is greater than or equal to, etc.) the target value. In some implementations, the user status satisfies the bonus award condition if the user status exceeds (or is greater than or equal to, etc.) the target value. If the gaming system determines that the play satisfies the bonus condition, the gaming system can execute STEP 414 of the method 400 to compute a bonus award amount. Otherwise, if the gaming system determines that the play does not satisfy the bonus condition, the gaming system can execute STEP 416 of the method 400.

The gaming system can compute a bonus award (STEP 414). Once it is determined that a game event satisfies the bonus award condition based on the first number, the gaming system can compute a bonus award based on the second number and the initial award amount. The gaming system can, for example, compute the bonus award by multiplying the wager and the second number. In some implementations, the gaming system can compute the bonus award by performing a lookup in a bonus pay-table, and multiplying the value in the bonus pay-table corresponding to the target value by the second number. In some implementations, addition can be used in place of subtraction. In some implementations, the gaming system can generate a third number, in response to the game event satisfying the bonus award condition, and compute the bonus award as the third number multiplied by (or in some implementations, added to) the second number. The gaming system can store the bonus award value, along with any of the information described herein, in one or more data structures in the account 270 data corresponding to the user. In some implementations, if a bonus wager is provided in addition to a normal wager, the bonus wager can be used as described herein above to determine the bonus award amount, instead of the normal wager.

The gaming system can increase a credit balance (STEP 416). The gaming system can cause the credit balance to increase based on the computed bonus award or the initial award amount. In some implementations, the gaming system can cause the credit balance to increase only by the bonus award amount, rather than the initial award amount or a combination of the initial award amount and the bonus award amount. In some implementations, the gaming system can cause the credit balance to increase by a sum of the initial award amount and the bonus award amount. If the bonus award amount is zero (e.g., the bonus award condition was not met, etc.), the gaming system can increase the credit balance only by the initial award amount. The gaming system can store the updated credit amount in the account corresponding to the user playing the game. In some implementations, the gaming system can store a record of the award amount(s) won, in association with one or more timestamps corresponding to the time the award amount(s) were won, in the account of the user.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, e.g., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The terms "data processing apparatus", "data processing system", "client device", "computing platform", "computing device", or "device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system such as the gaming system 205 can include clients and servers. For example, the gaming system 205 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving input from a user interacting with the client device). Data generated at the client device (e.g., a result of an interaction, computation, or any other event or computation) can be received from the client device at the server, and vice-versa.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the gaming system 205 could be a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided may be useful for providing games having bonus award opportunities, the systems and methods described herein may be applied to other environments. The foregoing implementations are illustrative rather than limiting of the described systems and methods. The scope of the systems and methods described herein may thus be indicated by the appended claims, rather than the foregoing description, and changes that come within the meaning and range of equivalency of the claims are embraced therein.

What is claimed is:

1. A gaming system comprising:
one or more processors coupled to memory, the one or more processors configured to:
receive, from a client device in communication with the one or more processors, an indication of a wager on a play of a game;
decrease a credit balance based on the wager;
determine, responsive to the indication of the wager, a first number as a target value and a second number as a modifier;
provide, for presentation at the client device, the first number for presentation at a first predetermined location and the second number for presentation at a second predetermined location, the first number and the second number presented prior to receiving input to update a game state of the play of the game from the client device;
responsive to determining and providing the first number and the second number for presentation, receive an input from the client device to update the game state of the play of the game;
upon the game state indicating completion of the play, determine an initial award amount based on the wager and a result of the play independent of the first number;
determine that a game event of the play satisfies a bonus award condition based on the first number and responsive to the result of the play indicating a win condition;
responsive to determining that the game event satisfies the bonus award condition, compute a bonus award based on the second number and the initial award amount; and
cause the credit balance to increase based on the computed bonus award and the initial award amount.

2. The gaming system of claim 1, wherein the game is a card-based game and the play comprises a hand having a plurality of cards, and wherein the one or more processors are further configured to adjust the credit balance based on the result of the play by increasing the credit balance based on the hand satisfying a game condition.

3. The gaming system of claim 2, wherein the card-based game is one of poker, blackjack, or rummy.

4. The gaming system of claim 2, wherein the one or more processors are configured to determine that the game event satisfies the bonus award condition by:
identifying each card included in the hand;
determining a total based on a value corresponding to each card; and
determining that the total is equal to the first number.

5. The gaming system of claim 1, wherein the game is a dice-based game and the play includes a plurality of dice each indicating a rank, and wherein the one or more processors are further configured to adjust the credit balance based on the result of the play by increasing the credit balance based on the rank of each of the plurality of dice satisfying a game condition.

6. The gaming system of claim 5, wherein the dice-based game is one of craps, sic bo, or Klondike.

7. The gaming system of claim 1, wherein the one or more processors are configured to compute the bonus award by multiplying the wager and the second number.

8. The gaming system of claim 1, wherein the one or more processors are further configured to:
receive, from the client device, a request to participate in a bonus opportunity corresponding to the bonus award; and
randomly determine the first number as the target value and the second number as the modifier responsive to the request to participate in the bonus opportunity and the wager.

9. The gaming system of claim 8, wherein the one or more processors are configured to receive the indication of the wager by:
providing, at the client device, a user interface via which a user can place the wager and select to participate in the bonus opportunity corresponding to the bonus award; and
receiving, from the client device, a request to place the wager, the request identifying a wager amount and an indicator indicating that the user is participating in the bonus opportunity.

10. The gaming system of claim 9, wherein the one or more processors are configured to:
provide, at the client device, prior to completion of the play, via the user interface, an actionable object via which the user can participate in the bonus opportunity corresponding to the bonus award;
receive, from the client device, responsive to an interaction with the actionable object prior to completion of the game, a request to participate in the bonus opportunity; and
determine that the game event satisfies the bonus award condition responsive to determining that the user is participating in the bonus opportunity.

11. The gaming system of claim 1, wherein the one or more processors are further configured to determine the first number and the second number using a random number generator.

12. The gaming system of claim 11, wherein the one or more processors are further configured to select the second number based on the result of the play.

13. The gaming system of claim 1, wherein the one or more processors are further configured to:
determine the first number using a random number generator; and
select the second number from a plurality of predetermined numbers in accordance with a policy.

14. A gaming system, comprising:
one or more processors coupled to memory, the one or more processors configured to:
receive, from a client device in communication with the one or more processors, an indication of a wager on a play of a blackjack game;
determine, responsive to the indication of the wager, a target hand value and a bonus modifier value;

provide, for presentation at the client device, the target hand value for presentation at a first predetermined location and the bonus modifier value for presentation at a second predetermined location, the target hand value and the bonus modifier value presented prior to receiving input to update a game state of the play of the game from the client device;

responsive to determining and providing the target hand value and the bonus modifier value for presentation, receive an input from the client device to update the game state of the play of the blackjack game;

upon the game state indicating completion of the play of the blackjack game, determine an initial award amount based on the wager and a hand of the blackjack game;

determine that the hand of the blackjack game satisfies a bonus award condition based on the target hand value and responsive to the game state indicating a win condition;

responsive to determining that the hand of the blackjack game satisfies the bonus award condition, compute a bonus award based on the bonus modifier value and the wager; and cause a credit balance to increase based on the computed bonus award and the initial award amount.

15. The gaming system of claim 14, wherein the one or more processors are further configured to determine the target hand value and the bonus modifier value by:

determining that the wager satisfies a bonus participation threshold; and computing at least one of the target hand value or the bonus modifier value based on the bonus participation threshold.

16. The gaming system of claim 14, wherein the one or more processors are further configured to:

present, at the client device, a graphical user interface comprising a blackjack table, and an actionable object;

receive the indication of the wager responsive to detecting an interaction with the actionable object; and present, in the graphical user interface, during the play of the blackjack game and responsive to receiving the indication of the wager, the hand of the blackjack game on the blackjack table.

17. The gaming system of claim 14, wherein the target hand value is a range of target values, and the one or more processors are further configured to determine that the hand of the blackjack game satisfies the bonus award condition by determining that values of each card in the hand sum to a value within the range of target values.

18. The gaming system of claim 14, wherein the one or more processors are further configured to:

receive, as part of the indication of the wager, an indication of participation in the bonus award, the indication of participation including a bonus wager; and compute the bonus award based on the bonus wager and the bonus modifier value.

* * * * *